W. LA F. DEKLE.
SAW SHARPENER.
APPLICATION FILED OCT. 31, 1913.
1,096,689.
Patented May 12, 1914.
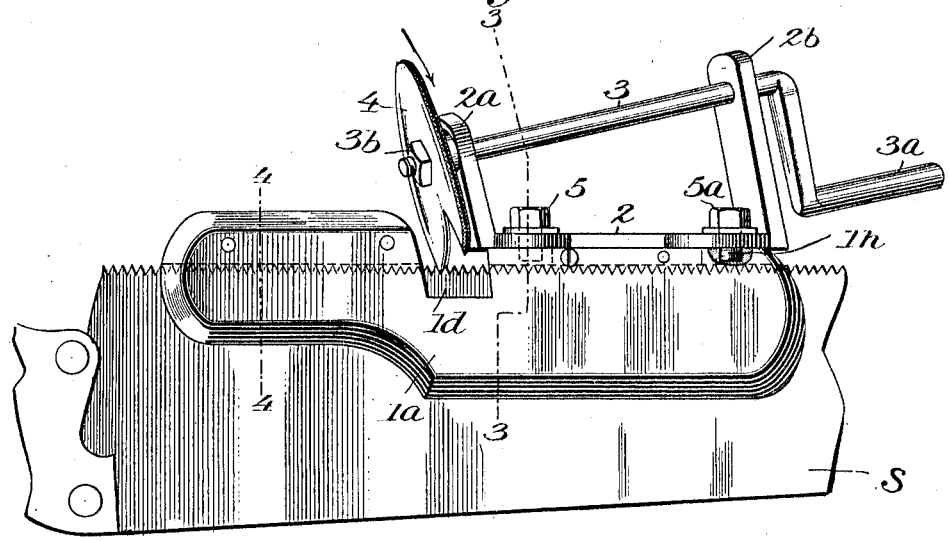
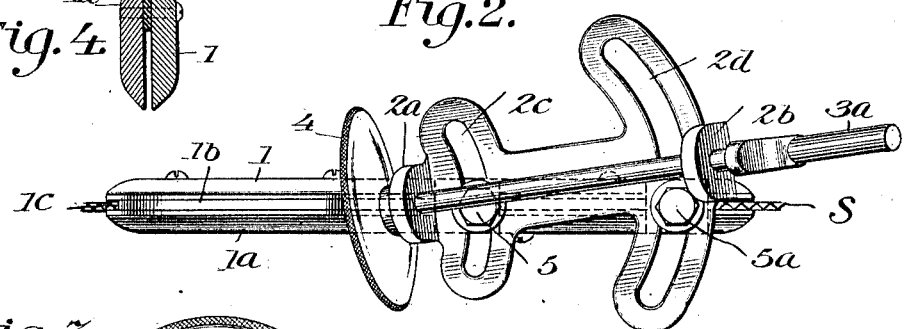
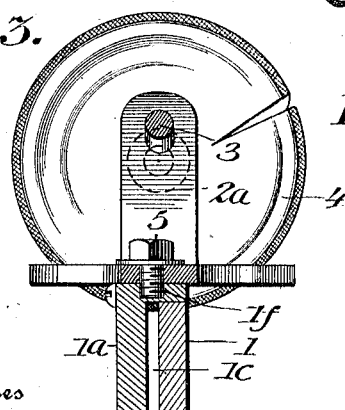
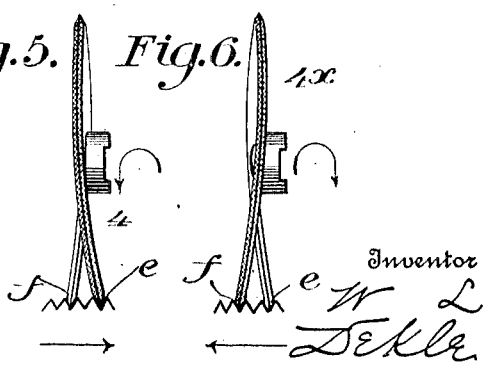

UNITED STATES PATENT OFFICE.

WILLIAM LA FAYETTE DEKLE, OF MACON, GEORGIA.

SAW-SHARPENER.

1,096,689. Specification of Letters Patent. Patented May 12, 1914.

Application filed October 31, 1913. Serial No. 798,521.

*To all whom it may concern:*

Be it known that I, WILLIAM LA FAYETTE DEKLE, a citizen of the United States, residing at Macon, in the county of Bibb and State of Georgia, have invented certain new and useful Improvements in Saw-Sharpeners; and I hereby declare that the following is a full, clear, and exact description thereof, reference being had to the accompanying drawings, which form part of this specification.

This invention is a novel saw sharpening machine adapted to quickly set and sharpen teeth of saws, and its object is to provide a machine which can be placed upon the saw, while the latter is held in a suitable clamp, and can be very easily operated, and will automatically feed itself along the saw and accomplish its work quickly and efficiently.

The accompanying drawings illustrate a practical embodiment of the invention, and I will explain the same with reference thereto and summarize in the claims following the description thereof the features and combinations of parts for which protection is desired.

In said drawings:—Figure 1 is a side view of the sharpening machine in operative position upon a saw blade. Fig. 2 is a top plan view of Fig. 1. Fig. 3 is a transverse section on line 3—3, Fig. 1. Fig. 4 is a detail view on line 4—4 of Fig. 1. Figs. 5 and 6 are edge views of the right and left interchangeable sharpening disks.

The machine comprises a slotted frame or support which is adapted to be placed upon and over the cutting edge of the saw S to be sharpened. This frame is preferably composed of opposite similar, but reverse, members 1, $1^a$, separated at their upper edges by an interposed portion $1^b$ so as to form a longitudinal slot $1^c$ between the members 1, $1^a$, below said portion, such slot approximately corresponding in width to the width of the saw. Said frame also preferably has a transverse notch $1^d$ in its upper side which extends below the strip $1^b$ and below the base of the teeth of the saw S, when the machine is in position upon the saw, as indicated in Fig. 1. Adjustably mounted upon this frame 1 at one side of the notch $1^d$ is a plate 2 which is provided with standards $2^a$ and $2^b$ in which is journaled a rotatable shaft 3 that carries the sharpening disks hereinafter referred to.

The plate 2 is preferably adjustable horizontally so that the shaft 3 can be set at any desired angle to the frame in order to cause the sharpening disk to give the desired hook or set to the teeth of the saw. For this purpose said plate is shown as provided with a short transverse arc-shaped slot $2^c$ adjacent the lower standard $2^a$, and a longer transverse arc-shaped slot $2^d$ adjacent the higher standard $2^b$, said slots being struck from a substantially common center, and the slot $2^c$ is engaged by a bolt 5 which is tapped into a threaded socket $1^f$ in the upper part of the frame 1; and the slot $2^d$ is engaged by a screw $5^a$ tapped into a threaded socket $1^h$ in the upper part of said frame, as shown. By loosening the bolts 5, $5^a$, the plate 2 can be adjusted horizontally transversely of the frame 1 so as to adjust the shaft horizontally at any desired angle to the saw; see Fig. 2.

The shaft 3 may be rotated by any desired means, and is shown as provided with a handle $3^a$ at one end by which it can be turned. As shown it is set at an angle to the plate, being higher at its outer end than at the inner end. On the inner end of this shaft may be removably secured either of a pair of sharpening disks, 4 or $4^x$, which are interchangeable; and are similar, except that the disk 4 is of right-hand pitch and the disk $4^x$ of left-hand pitch. These disks may be detachably secured on the end of the shaft in any suitable way, as by means of a nut $3^b$, and may be keyed or pinned to the shaft in any suitable way to prevent the disk turning on the shaft when in use.

Each disk is made of steel and its periphery is bent axially of the disk to form one spiral or single turn of a screw thread; and the said periphery is beveled and file-cut as shown, or otherwise formed, so that it will properly cut and sharpen the teeth of the saw. The spiral pitch of the periphery of the disk depends upon the number of teeth that the saw has to an inch;—for instance, for a No. 8 saw, having eight teeth to the inch, the sharpening disks should have a pitch of four threads to the inch, one right, the other left-hand. For a No. 10 saw the sharpening disks should have a pitch of five threads to the inch; etc.

In using the machine, the saw S is clamped in a vise or any other support, and the machine placed in position on top of the saw, as in Fig. 1, the plate 2 having been adjusted to cause the disk to give the desired amount of "hook" to the teeth. The disk is first engaged with the first tooth to be sharpened on the side (right or left) corresponding to the disk (right or left) being used. If the right-hand disk 4 is used it is placed on top of the saw at the end farthest from the crank, and by turning the crank in the direction indicated by the arrow in Fig. 5 the disk is rotated between and in engagement with the teeth of the saw, the entry end $e$ of the disk first engaging a tooth (see Fig. 5), such disk being rotated to the right, and as such disk is rotated, it, being spiral, forces the machine along the saw automatically, and as it moves along the top of the saw such disk 4 only engages every other tooth, see Fig. 5.

After going over the saw with the right disk 4, said disk is removed and the left-hand disk $4^\times$ put in its place, and the frame 2 adjusted to give the same hook to the left side of the saw as was given the right side. The entry edge $e$ of the disk $4^\times$ is then placed in the first tooth at the left missed by the right file and the motion of the crank reversed, and as the crank is turned the machine is carried along the saw, the disk $4^\times$ engaging every other tooth, (see Fig. 6) and skipping those filed by the disk 4. The machine thus feeds itself automatically along the entire length of the saw; and as it similarly sharpens both sides of the saw the points of the saw teeth are the same on each side of the saw and "every tooth alike"; consequently the saw does better work and will not run out of the line that is being sawed.

What I claim is:—

1. A saw sharpening machine comprising a frame consisting of two oppositely disposed side plates, having an opposed member separating them at their upper edges and thereby providing a slot for the reception of the toothed edge of the saw to be sharpened, a plate attached to said frame and adapted to be adjusted transversely thereof and provided with bearings, a shaft inclined upwardly with relation to the line of the teeth of the saw and mounted in said bearings, and a sharpening disk attached to said shaft adapted to engage the teeth of the saw, and to advance the machine along the saw as the shaft is rotated.

2. A machine for sharpening saws comprising a slotted frame adapted to be placed upon the cutting edge of the saw to be sharpened and having a transverse notch extending below the base of the teeth of the saw when the saw is mounted thereon, a plate attached to said frame and adjustable transversely thereof, standards carried by said plate, a shaft inclined upwardly with relation to the line of the teeth of the saw and rotatably mounted in said standards, a sharpening disk attached to said shaft, the periphery of such disk forming a complete single spiral or thread having a pitch equal to the distance between the edges of two adjacent teeth of the saw so that for each rotation the disk will move the machine a distance of two teeth along the saw and will skip every other tooth.

3. A machine for sharpening saws comprising a slotted frame adapted to be placed upon the cutting edge of the saw to be sharpened, a plate above said frame having slots, standards rising from said plate and having bearings therein for a shaft, bolts extending through said slots and engaging the frame; a shaft inclined upwardly with relation to the line of the teeth of the saw and mounted in said bearings, and a sharpening disk attached to said shaft.

In testimony that I claim the foregoing as my own, I affix my signature in presence of two witnesses.

WILLIAM LA FAYETTE DEKLE.

Witnesses:
HUGH McKEERVEY,
B. J. BOLKCOVE.

---

Copies of this patent may be obtained for five cents each, by addressing the "Commissioner of Patents, Washington, D. C."